(12) United States Patent
Morrison et al.

(10) Patent No.: US 12,178,162 B2
(45) Date of Patent: Dec. 31, 2024

(54) COMBINE HARVESTERS HAVING AIR CHANNEL ASSEMBLIES, AND RELATED METHODS

(71) Applicant: AGCO International GmbH, Neuhausen (CH)

(72) Inventors: Alastair Cameron Morrison, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 784 days.

(21) Appl. No.: 17/381,302

(22) Filed: Jul. 21, 2021

(65) Prior Publication Data
US 2022/0022377 A1 Jan. 27, 2022

(30) Foreign Application Priority Data

Jul. 23, 2020 (GB) .................................... 2011385

(51) Int. Cl.
*A01F 12/48* (2006.01)
*A01F 12/18* (2006.01)
*A01F 12/44* (2006.01)

(52) U.S. Cl.
CPC ............ *A01F 12/48* (2013.01); *A01F 12/184* (2013.01); *A01F 12/444* (2013.01); *A01F 12/446* (2013.01)

(58) Field of Classification Search
CPC ...... A01F 12/48; A01F 12/184; A01F 12/444; A01F 12/446
See application file for complete search history.

(56) References Cited

U.S. PATENT DOCUMENTS

| | | | | |
|---|---|---|---|---|
| 4,265,077 A | * | 5/1981 | Peters | A01F 12/444 460/98 |
| 4,401,128 A | * | 8/1983 | Fisher | A01F 12/44 460/99 |
| 5,558,576 A | * | 9/1996 | Meyers | A01F 12/444 460/99 |
| 5,624,315 A | | 4/1997 | Jonckheere | |
| 7,877,969 B2 | | 2/2011 | Behnke | |

(Continued)

FOREIGN PATENT DOCUMENTS

| | | | |
|---|---|---|---|
| DE | 1403495 | * | 1/1969 |
| DE | 4028993 A1 | | 3/1992 |

(Continued)

OTHER PUBLICATIONS

UK Intellectual Property Office, Search Report for related UK Priority Application No. GB2011385.8, dated Jan. 20, 2021.

*Primary Examiner* — Thomas B Will
*Assistant Examiner* — Ashley A Kaercher (57) ABSTRACT

A combine harvester includes a cleaning shoe, which has a chaffer, a sieve below the chaffer, a blower configured to direct air rearward and upward through the sieve and the chaffer, and an air channel assembly defining a plurality of longitudinal air channels positioned to receive air from the blower under a forward end of the sieve and deliver the air to a position rearward along a length of the sieve. The air channels are spaced such that the air channel assembly defines free paths between adjacent air channels such that grain falling downward through the sieve does not obstruct rearward air flow through the air channels.

7 Claims, 5 Drawing Sheets

(56) References Cited

U.S. PATENT DOCUMENTS

| | | |
|---|---|---|
| 9,345,197 B2 | 5/2016 | Biggerstaff et al. |
| 9,426,943 B2 | 8/2016 | Bilde |
| 9,629,310 B2 | 4/2017 | Bilde |
| 2014/0128133 A1 | 5/2014 | Claerhout |

FOREIGN PATENT DOCUMENTS

| | | | |
|---|---|---|---|
| EP | 475453 | * | 3/1992 |
| GB | 917050 A | | 1/1963 |

* cited by examiner

FIG. 5 though understanding of example embodiments of the present disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

COMBINE HARVESTERS HAVING AIR CHANNEL ASSEMBLIES, AND RELATED METHODS

CROSS-REFERENCE TO RELATED APPLICATION

This application claims the benefit of the filing date of United Kingdom Patent Application 2011385.8, "Combine Harvesters having Air Channel Assemblies, and Related Methods," filed Jul. 23, 2020, the entire disclosure of which is incorporated herein by reference.

FIELD

Embodiments of the present disclosure relate to combine harvesters. More particularly, embodiments of the present disclosure relate to apparatuses and methods for controlling air flow through a separation system.

BACKGROUND

Self-propelled combine harvesters are used by farmers to harvest a wide range of crops. Typically, a combine harvester cuts crop material, threshes grain therefrom, separates the threshed grain from the straw, and cleans the grain before storage in an onboard tank. Straw and crop residue is ejected from the rear of the combine harvester in the field.

Transverse threshing combine harvesters have a threshing cylinder that rotates on a transverse axis and threshes a harvested crop stream. Grain and chaff separated in this process falls due to gravity through a grate onto an underlying thresher pan, which is driven in an oscillating manner to convey the grain and chaff rearward to a rear edge, where the grain and chaff falls into a cleaning unit. The remainder of the crop stream from the threshing process is conveyed rearward from the threshing cylinder into a separating apparatus, which may include a plurality of straw walkers or one or more axial rotors. During the separating process, further grain and chaff is removed from the straw and falls through a grate onto a separator pan that is also driven in an oscillating manner to convey the grain and chaff forward to a front edge, where it falls by gravity into the cleaning unit. The straw by-product from the separating apparatus is ejected from the rear of the combine.

The cleaning unit of most combines operates according to a well-established process in which grain and chaff (also referred to in the art as material other than grain (MOG)) cascading down from the thresher and separator pans is subjected to an airstream created by one or more fans. A chaffer has a frame that supports a series of louvers, which are positioned to allow grain to fall downward through the chaffer while allowing a flow of cleaning air to pass upward and rearward through the chaffer. The cleaning air flow tends to force MOG rearward and restricts MOG from falling through the chaffer. The heavier grain falls through the chaffer and optionally through another cleaning sieve below before being conveyed to the grain tank.

The speed of the airflow through the chaffer may be selected to balance various operational parameters for agronomic benefit, such as percentage of chaff removed from the crop stream, percentage of grain lost from the rear of the machine, mass throughput, and fuel usage.

Cleaning units in combine harvesters are described in more detail in, for example, U.S. Pat. No. 9,426,943, "Combine Harvester Grain Cleaning Apparatus," issued Aug. 30, 2016; U.S. Patent Application Publication 2014/0128133, "Harvester Having Chaffer with Tiltable Section," published May 8, 2014; and U.S. Pat. No. 5,624,315, "Cleaning Means for an Agricultural Harvesting Machine," issued Apr. 29, 1997.

BRIEF SUMMARY

A combine harvester has a longitudinal axis extending from a forward end to a rearward end thereof. The combine harvester includes a cleaning shoe, which has a chaffer, a sieve below the chaffer, a blower configured to direct air rearward and upward through the sieve and the chaffer; and an air channel assembly defining a plurality of longitudinal air channels positioned to receive air from the blower under a forward end of the sieve and deliver the air to a position rearward along a length of the sieve. The air channels are spaced such that the air channel assembly defines free paths between adjacent air channels such that grain falling downward through the sieve does not obstruct rearward air flow through the air channels.

An air channel assembly for a cleaning shoe of a combine harvester includes a body defining a plurality of longitudinal air channels configured to receive air from a blower under a forward end of a sieve and deliver the air to a position rearward along a length of the sieve. The air channels are spaced such that the air channel assembly defines free paths between adjacent air channels such that grain falling downward through the sieve does not obstruct rearward air flow through the air channels.

A method of operating a combine harvester includes passing a first portion of air toward a front underside of a sieve above air channels, passing a second portion of air through the air channels and toward a rear underside of the sieve, and passing grain material downward through the sieve and between the air channels.

BRIEF DESCRIPTION OF THE DRAWINGS

While the specification concludes with claims particularly pointing out and distinctly claiming what are regarded as embodiments of the present disclosure, various features and advantages of the disclosure may be more readily ascertained from the following description of example embodiments when read in conjunction with the accompanying drawings, in which:

DETAILED DESCRIPTION

The illustrations presented herein are not actual views of any combine harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

From reading the following description it should be understood that the terms longitudinal and transverse are made in relation to the combine harvester's normal direction of travel. In other words, the term 'longitudinal' equates to the fore and aft direction, whereas the term 'transverse' equates to the crosswise direction, or left and right. Furthermore, the terms 'axial' and 'radial' are made in relation to a rotating body such as a shaft, wherein axial relates to a direction along the rotation axis and radial equates to a direction perpendicular to the rotation axis.

Figure 1:
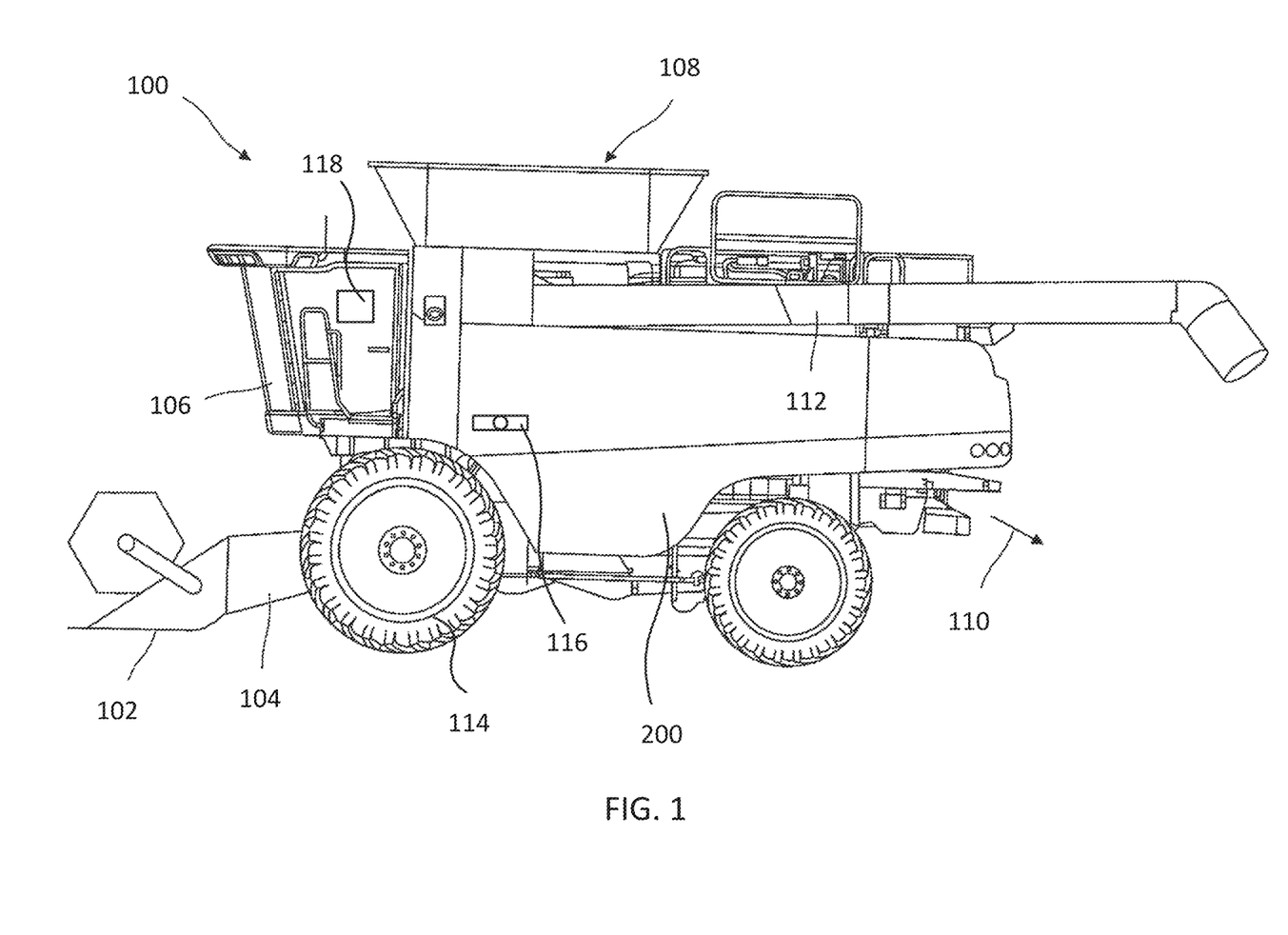
FIG. 1 is a simplified side view of a combine harvester.

With reference to FIG. 1, a self-propelled combine harvester 100 carries a header 102 that cuts and gathers a strip of crop as the combine harvester 100 is driven across a crop field. A feederhouse 104 conveys the cut crop stream from the header 102 into a crop processing apparatus 200 in the combine harvester 100, described in more detail below. Clean grain separated from the crop stream is collected in a storage tank 108, which is periodically emptied into a trailer or other vehicle or storage container via an unloading auger 112. Residue material remaining from the crop stream, such as straw and chaff, is ejected from the rear of the combine harvester 100, represented by arrow 110. The combine harvester 100 also typically includes an operator cab 106, an engine, and wheels 114 and/or tracks. In some embodiments, the combine harvester 100 may include a controller 118, typically located in the operator cab 106, which the operator may use to control the combine harvester 100.

Figure 2:
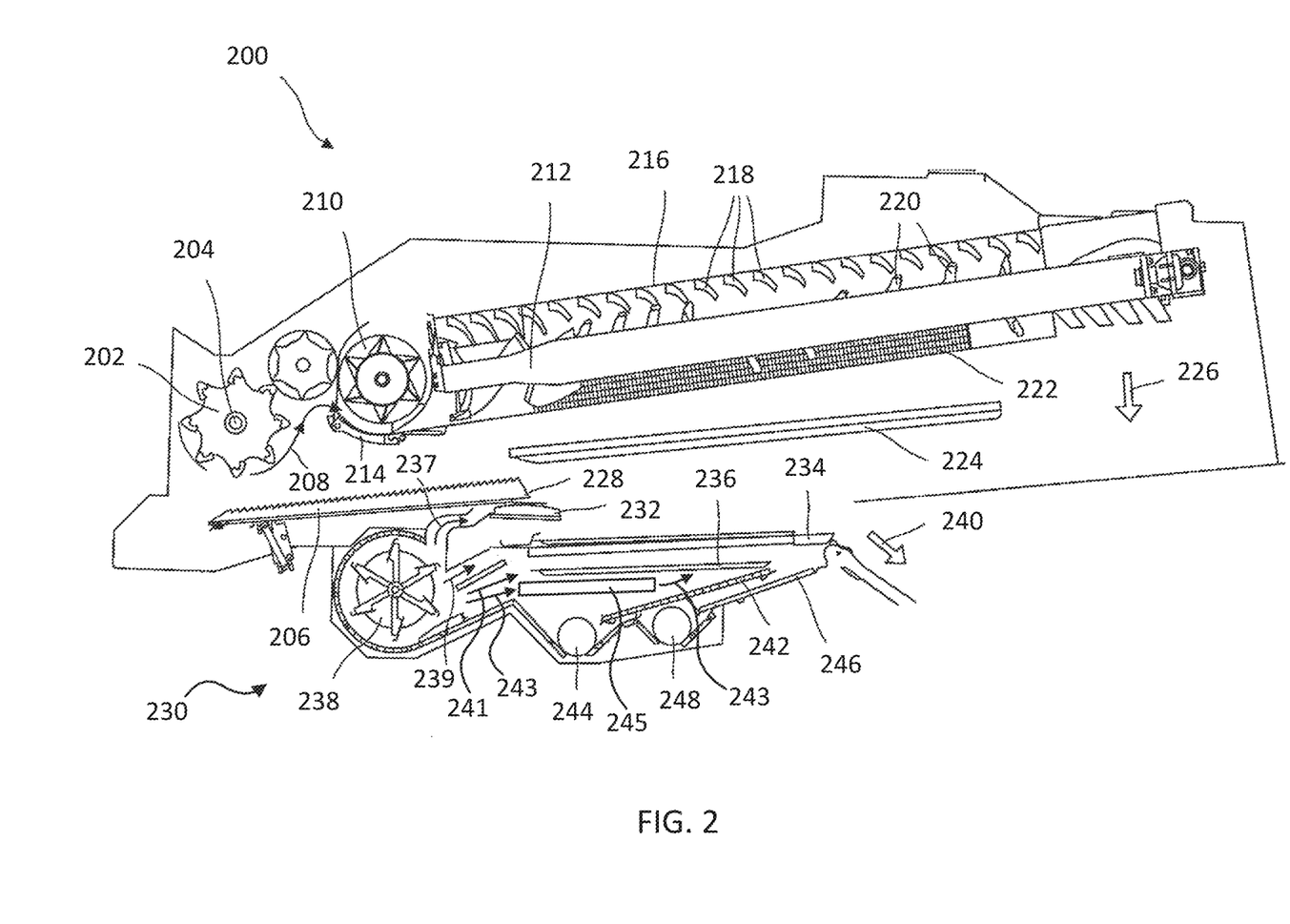
FIG. 2 is a simplified side view of a crop processing apparatus that may be used in the combine harvester of FIG. 1.

The crop processing apparatus 200 is shown in more detail in FIG. 2. The crop stream passes from the feederhouse 104 into a threshing unit having a transverse threshing cylinder 202 that rotates around a transverse axis 204. As in known combines, the crop stream is threshed between the threshing cylinder 202 and a concave surface (not shown). Grain and chaff separated in this process fall through a grate in the concave onto an underlying thresher pan 206, forming a primary grain/chaff stream. The residue straw is conveyed rearward as represented by arrow 208 from the threshing unit to a transverse transfer beater 210. From here, the crop stream is typically divided into two sub-streams and passed into respective longitudinally-aligned separating rotors 212. It will be appreciated that only one separating rotor 212 is shown in FIG. 2, with the other separating rotor 212 being hidden from view. The transfer beater 210 has associated therewith a concave grate 214 through which further grain and chaff may fall by gravity onto the underlying thresher pan 206.

Each separating rotor 212 has associated therewith a substantially cylindrical cage 216 within which the separating rotor 212 rotates. Upon the inside upper peripheral surface of the rotor cages 216, a plurality of guide vanes 218 are mounted for cooperation with fingers 220 of the separating rotor 212, which together further separate grain from straw. The lower portion of each cage 216 has a separator grate 222, which allows separated grain and chaff to fall by gravity onto an underlying separator pan 224, forming a secondary grain/chaff stream.

The residue straw is ejected from the crop processing apparatus 200 at the rear of the separating rotors 212, as indicated by arrow 226.

Although the above described crop processing apparatus 200 includes a threshing cylinder 202 and transverse transfer beater 210 followed by a pair of longitudinal separating rotors 212 operating on an axial separation principle (which may be referred to in the art as a "hybrid" processing system), different processing apparatus may be used in some embodiments. For example, the separating rotors 212 may be replaced with straw walkers, as described in U.S. Pat. No. 7,877,969, "Method for Adjusting a Working Unit of a Harvesting Machine," granted Feb. 1, 2011. In other embodiments, the threshing cylinder 202 and transverse transfer beater 210 may be replaced by a feed cylinder, and threshing may be caused by the rotors 212, as described in U.S. Pat. No. 9,629,310, "Grain Separating Apparatus in a Combine Harvester," granted Apr. 25, 2017. In still other embodiments, the crop processing apparatus 200 may include one or more transverse rotors, as described in U.S. Pat. No. 9,345,197, "Combine Harvester with Even Crop Distribution," granted May 24, 2016.

Both the thresher pan 206 and separator pan 224 are driven in an oscillating manner to convey grain and chaff streams rearward and forward respectively. The drive mechanism for the thresher pan 206 and separator pan 224 is conventional and is not described in detail herein.

In some embodiments, a stream of grain and chaff is transferred from a rear edge 228 of the thresher pan 206 to a cleaning shoe 230. The grain and chaff may initially fall onto a cascade pan 232 before falling from the rear edge 228 onto a chaffer 234 in the cleaning shoe 230. In other embodiments, various mechanisms may be used to convey the stream of grain and chaff to the cleaning shoe 230, which mechanisms are generally known in the art and not described in detail herein.

One or more blowers 238 generate a cleaning airstream, a portion of which is directed rearward between the thresher pan 206 and cascade pan 232 as represented by arrow 237. The lighter chaff may be blown rearward and carried by the airstream out of the rear of the crop processing apparatus 200 as represented by arrow 240, while the heavier grain falls onto the cascade pan 232, and then onto the chaffer 234. Another airstream, represented by arrow 239, is directed rearward between the chaffer 234 and a sieve 236. Additional airstreams 241, 243 are directed under the sieve 236. The airstream(s) 237, 239, 241, 243 from the blower(s) 238 may be directed along any selected path, such as by vanes or guides. The airstream 243 may be directed through or under an air channel assembly 245 such that the airstream 243 can pass to point rearward from the front of the sieve 236.

The cascading motion of the grain and chaff allows the airstream(s) 239, 241, 243 to convey additional chaff toward the rear of the cleaning shoe 230. The chaffer 234 is coarser (having larger openings) than the sieve 236, which is located under the chaffer 234. The chaffer 234 and sieve 236 may also be referred to in the art as an upper sieve and lower sieve, respectively, because they may be of generally the same construction.

The chaffer 234 and the sieve 236 are generally driven forward and aft in an oscillating manner. Straw and material too large to pass through chaffer 234 is conveyed rearward by the oscillating motion and the airstreams 239, 241, 243 before falling from the rear edge and out of the rear of the crop processing apparatus 200, as indicated by arrow 240. Tailings (unthreshed grain) and grain pass through the chaffer 234 onto the sieve 236. Grain falls through sieve 236 onto an underlying collection pan 242, which directs the clean grain to a transverse delivery auger 244 for delivering the grain to the storage tank 108 (FIG. 1). The tailings that cannot pass through the holes in the sieve 236 are conveyed rearward by the oscillating motion and the airstreams 241, 243 before falling from the rear edge of the sieve 236 onto a tailings collection pan 246, which delivers the tailings to a rethreshing delivery system 248, which may include, for example, an auger, a blower, and/or a conveyor.

Figure 3:
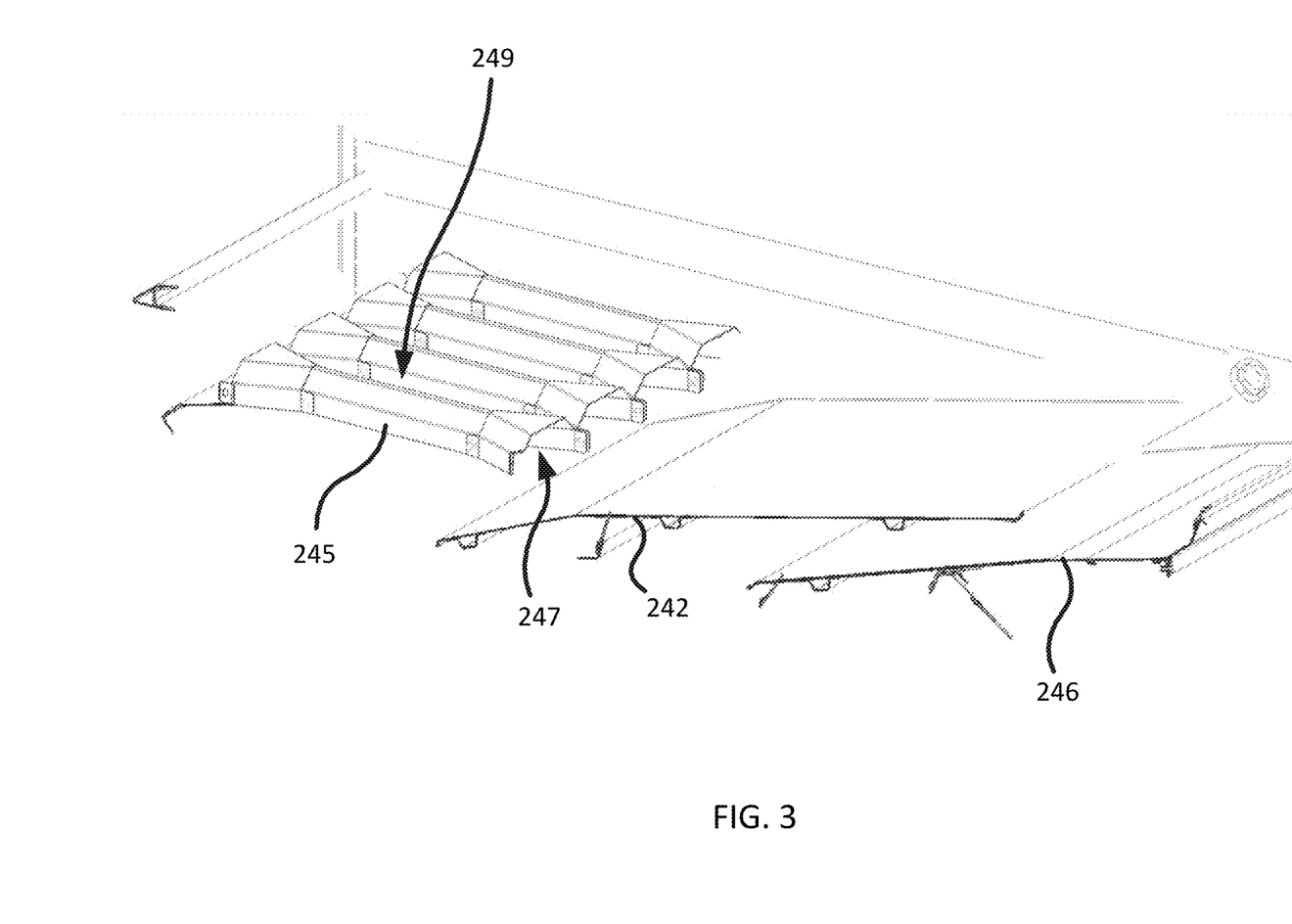
FIG. 3 is a simplified perspective view of parts of a cleaning shoe of the crop processing apparatus of FIG. 2.

FIG. 3 is a simplified perspective view of portions of the cleaning shoe 230 (in particular, portions of the air channel assembly 245, the collection pan 242, and the tailings collection pan 246). The air channel assembly 245 as shown may define a plurality of longitudinal air channels 247 that receive air from the blower 238 under a forward end of the sieve 236 and deliver the air to a position rearward along the length of the sieve 236. Free paths 249 between adjacent air channels 247 enable grain to fall downward from the sieve 236 without obstructing rearward air flow through the air channels 247. The air channels 247 may flare laterally outward at the ends to receive and deliver air over substantially the entire width of the air channel assembly 245. Thus, the air channels 247 may be narrower in a center portion than at the ends. This provides the space for the free paths 249.

Figure 4:
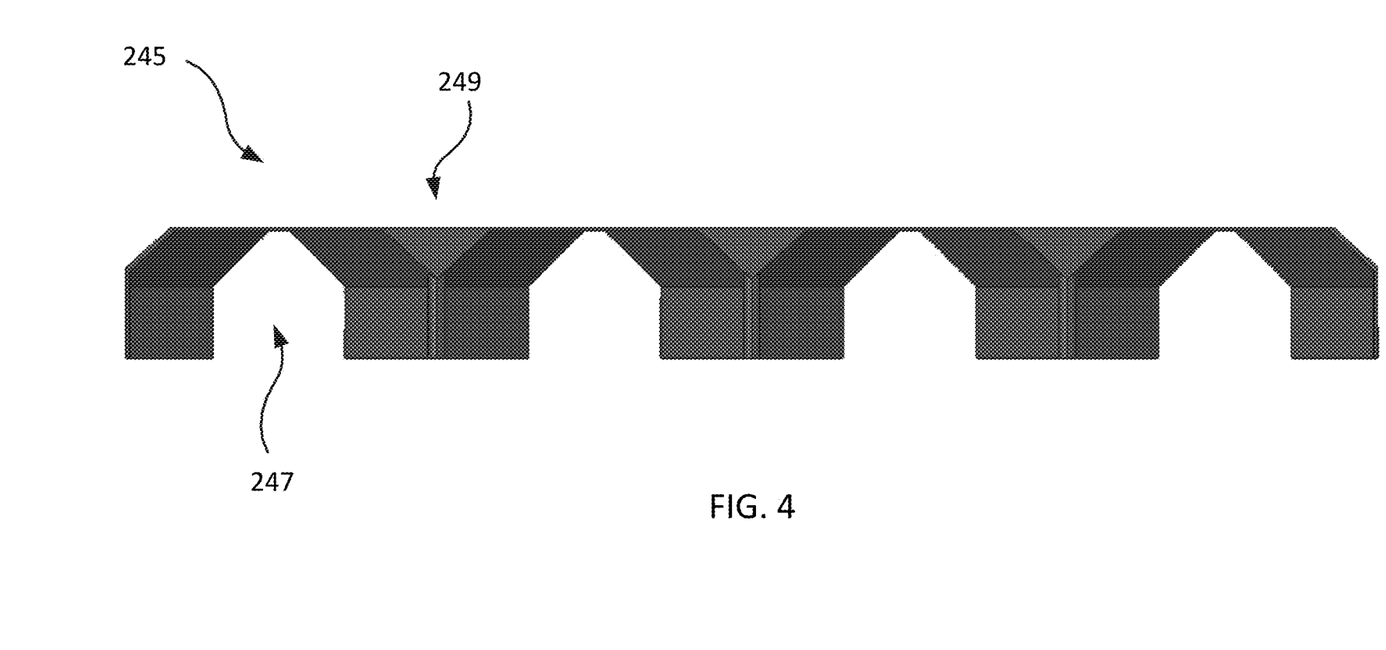
FIG. 4 is a simplified end view of an air channel assembly of the cleaning shoe shown in FIG. 3.

FIG. 4 is a simplified end view of the air channel assembly 245 alone. As shown, the air channels 247 may be open in a downward direction, and closed at the top. This tends to keep grain from clogging the air channels 247 by directing the grain through the free paths 249 between adjacent air channels 247. In some embodiments, the air channels 247 may form longitudinal peaks, which limits the amount of flat surfaces atop the air channel assembly 245, on which grain could rest. That is, the air channel assembly 245 may have upward sloping walls that meet at the peak of each air channel 247.

In some embodiments, the air channel assembly 245 may be a unitary structure defining multiple air channels 247. For example, the air channel assembly 245 shown in FIGS. 3 and 4 defines four distinct air channels 247. One or more air channel assemblies 245 may be installed into a single crop processing apparatus 200 across the entire width of the sieve 236. For example, a crop processing apparatus 200 may include two, three, four, etc. air channel assemblies 245. In other embodiments, each air channel 247 may be defined by an individual member, and the members may together form the air channel assembly 245. In such embodiments, individual members may be installed separately (e.g., for repair of a damaged part).

The air channel assembly 245 may be formed of any selected material, based on material properties (e.g., durability, weight, cost, manufacturing considerations, etc.). Typically, the air channel assembly 245 may be made of sheet metal (e.g., aluminum, steel, etc.) or a polymer (e.g., polypropylene, polyethylene, polystyrene, etc.). Polymer materials may be particularly desirable because manufacturing is relatively simpler than metal materials. For example, an air channel assembly 245 may be formed of a polymer material by injection molding, with little or no machining.

Investigations of combine harvester cleaning systems have found that when a combine harvester is operated at high throughput to harvest certain crops, the grain material can become nearly impenetrable to air flow. This causes high air velocities near the front of the chaffer and sieve, and almost no airflow at the rear. The low airflow causes the crop material on the rear of the chaffer and/or the sieve to be conveyed almost entirely by mechanical movement of the chaffer and sieve, rather than by fluidization in air. Thus, the rear of the chaffer and sieve may not provide separation efficiencies as designed once the material throughput reaches a certain level.

The air channels 247 of the air channel assembly 245 may reduce or eliminate this problem by enabling some air to flow toward the rear of the sieve 236 unobstructed by grain material. Some of the grain may fall through the free paths 249 between adjacent air channels 247. Because the air channel assembly 245 directs the falling grain around the air channels 247, the crop processing apparatus 200 can be operated at relatively higher throughput than conventional systems while maintaining air flow to the rear of the chaffer 234 and sieve 236.

Figure 5:
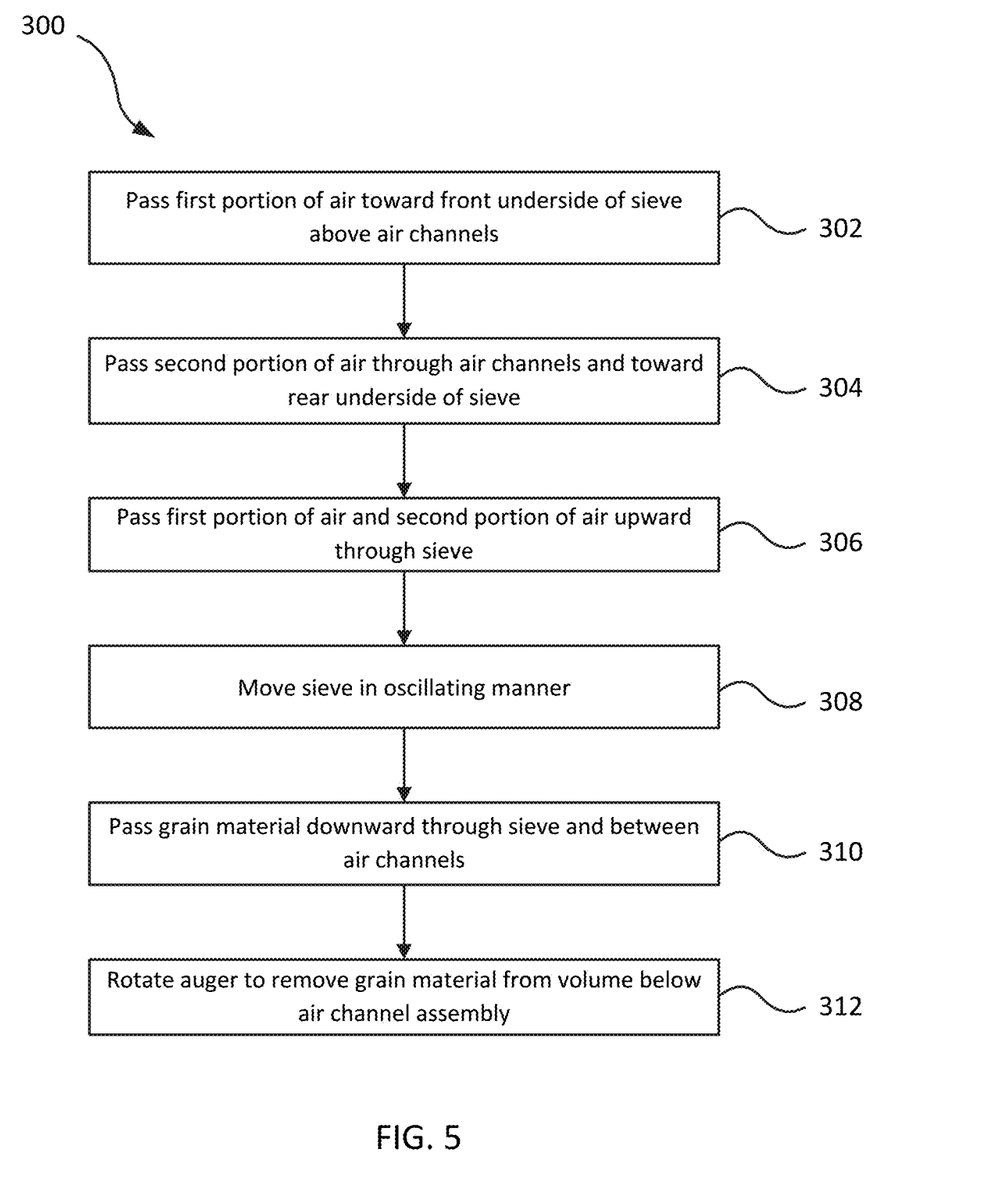
FIG. 5 is a simplified flow chart illustrating a method of using a combine harvester to harvest a crop in an agricultural field.

FIG. 5 is a simplified flow chart illustrating a method 300 of using the combine harvester 100 to harvest crops in agricultural fields and separate grain from MOG. In block 302, a first portion of air 241 is passed toward a front underside of a sieve 236 above air channels 247. In block 304, a second portion of air 243 is passed through the air channels 247 and toward a rear underside of the sieve 236. In block 306, the first and second portions of air are passed upward through the sieve 236—the first portion 241 near front of the sieve 236 and the second portion 243 near the rear of the sieve 236. In block 308, the sieve 236 is moved or vibrated in an oscillating manner. In block 310, grain material passes downward through the sieve 236 and between the air channels 247, and this does not obstruct air flow through the air channels 247. In block 312, an auger 244 rotates to remove grain material from a volume below the air channel assembly 245. Though depicted as a flow chart, the actions in FIG. 5 may be performed concurrently, and in some embodiments, some actions may be omitted.

Additional non-limiting example embodiments of the disclosure are described below.

Embodiment 1: A combine harvester having a longitudinal axis extending from a forward end to a rearward end thereof, the combine harvester comprising a cleaning shoe. The cleaning shoe comprises a chaffer, a sieve below the chaffer, a blower configured to direct air rearward and upward through the sieve and the chaffer, and an air channel assembly defining a plurality of longitudinal air channels positioned to receive air from the blower under a forward end of the sieve and deliver the air to a position rearward along a length of the sieve. The air channels are spaced such that the air channel assembly defines free paths between adjacent air channels such that grain falling downward through the sieve does not obstruct rearward air flow through the air channels.

Embodiment 2: The combine harvester of Embodiment 1, wherein the air channels are open in a downward direction along an entire length thereof.

Embodiment 3: The combine harvester of Embodiment 1 or Embodiment 2, wherein the air channels have closed tops.

Embodiment 4: The combine harvester of any one of Embodiment 1 through Embodiment 3, wherein the air channel assembly defines a plurality of longitudinal peaks in each air channel.

Embodiment 5: The combine harvester of Embodiment 4, wherein the air channel assembly comprises walls that slope upward toward the longitudinal peaks.

Embodiment 6: The combine harvester of any one of Embodiment 1 through Embodiment 5, wherein each air channel is flared laterally outward at each end thereof.

Embodiment 7: The combine harvester of any one of Embodiment 1 through Embodiment 6, wherein the air channel assembly comprises a material selected from the group consisting of metals and polymers.

Embodiment 8: The combine harvester of any one of Embodiment 1 through Embodiment 7, wherein the air channel assembly comprises a unitary structure defining the plurality of air channels.

Embodiment 9: An air channel assembly for a cleaning shoe of a combine harvester, comprising a body defining a plurality of longitudinal air channels configured to receive air from a blower under a forward end of a sieve and deliver the air to a position rearward along a length of the sieve. The air channels are spaced such that the air channel assembly defines free paths between adjacent air channels such that grain falling downward through the sieve does not obstruct rearward air flow through the air channels.

Embodiment 10: A method of operating a combine harvester having an air channel assembly defining a plurality of longitudinal air channels positioned to receive air from a blower under a forward end of a sieve and deliver the air to a position rearward along a length of the sieve. The method comprises passing a first portion of air toward a front underside of the sieve above the air channels, passing a second portion of air through the air channels and toward a rear underside of the sieve, and passing grain material downward through the sieve and between the air channels.

Embodiment 11: The method of Embodiment 10, wherein passing grain material downward through the sieve and between the air channels does not obstruct air flow through the air channels.

Embodiment 12: The method of Embodiment 10 or Embodiment 11, further comprising passing the first portion of air and the second portion of air upward through the sieve.

Embodiment 13: The method of any one of Embodiment 10 through Embodiment 12, further comprising moving the sieve in an oscillating manner.

Embodiment 14: The method of any one of Embodiment 10 through Embodiment 13, further comprising rotating an auger to remove the grain material from a volume below the air channel assembly.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A combine harvester having a longitudinal axis extending from a forward end to a rearward end thereof, the combine harvester comprising:
   a cleaning shoe comprising:
      a chaffer;
      a sieve below the chaffer;
      a blower configured to direct air rearward and upward through the sieve and the chaffer; and
      an air channel assembly defining a plurality of longitudinal air channels positioned to receive air from the blower under a forward end of the sieve and deliver the air to a position rearward along a length of the sieve;
      wherein the air channels are open in a downward direction along an entire length thereof and are spaced such that the air channel assembly defines free paths between adjacent air channels such that grain falling downward through the sieve does not obstruct rearward air flow through the air channels.

2. The combine harvester of claim 1, wherein the air channels have closed tops.

3. The combine harvester of claim 1, wherein the air channel assembly defines a plurality of longitudinal peaks in each air channel.

4. The combine harvester of claim 3, wherein the air channel assembly comprises walls that slope upward toward the longitudinal peaks.

5. The combine harvester of claim 1, wherein each air channel is flared laterally outward at each end thereof.

6. The combine harvester of claim 1, wherein the air channel assembly comprises a material selected from the group consisting of metals and polymers.

7. The combine harvester of claim 1, wherein the air channel assembly comprises a unitary structure defining the plurality of air channels.

\* \* \* \* \*